(12) United States Patent
Fuchs et al.

(10) Patent No.: US 8,969,492 B2
(45) Date of Patent: Mar. 3, 2015

(54) FLOURINE-FREE AQUEOUS DISPERSION FOR TREATING TEXTILE FABRICS

(75) Inventors: Andreas Fuchs, München (DE); Wilhelm Artner, Motzenhofen (DE); Barbara Zwikirsch, Weißenhorn (DE)

(73) Assignee: Huntsman Textile Effects (Germany) GmbH (DE)

( * ) Notice: Subject to any disclaimer, the term of this patent is extended or adjusted under 35 U.S.C. 154(b) by 826 days.

(21) Appl. No.: 13/259,182

(22) PCT Filed: Mar. 6, 2010

(86) PCT No.: PCT/EP2010/001415
§ 371 (c)(1),
(2), (4) Date: Sep. 23, 2011

(87) PCT Pub. No.: WO2010/115496
PCT Pub. Date: Oct. 14, 2010

(65) Prior Publication Data
US 2012/0015575 A1    Jan. 19, 2012

(30) Foreign Application Priority Data
Mar. 28, 2009  (EP) .................................. 09004522

(51) Int. Cl.
| | | |
|---|---|---|
| *C08F 2/00* | (2006.01) | |
| *C08G 85/00* | (2006.01) | |
| *C08F 4/00* | (2006.01) | |
| *D06M 15/233* | (2006.01) | |
| *C08F 220/18* | (2006.01) | |
| *D06M 15/248* | (2006.01) | |
| *D06M 15/263* | (2006.01) | |
| *C08F 214/06* | (2006.01) | |

(52) U.S. Cl.
CPC .......... *D06M 15/233* (2013.01); *C08F 220/18* (2013.01); *D06M 15/248* (2013.01); *D06M 15/263* (2013.01); *C08F 214/06* (2013.01); *D06M 2200/12* (2013.01)
USPC ............................................... 526/89; 526/72

(58) Field of Classification Search
CPC .... C08F 220/18; C08F 220/62; C08F 220/64; C08F 212/08; C08F 214/08
See application file for complete search history.

(56) References Cited

U.S. PATENT DOCUMENTS 6,664,327 B2 * 12/2003 Daisey et al. ................. 524/523
6,696,519 B2 * 2/2004 Brown et al. ................. 524/804
2004/0102114 A1  5/2004 Boylan

FOREIGN PATENT DOCUMENTS

| EP | 1 127 898 | 8/2001 |
|---|---|---|
| EP | 1 424 433 | 8/2008 |
| EP | 2 009 035 | 12/2008 |
| JP | 2000/248140 | 9/2000 |
| JP | 2005/105042 | 4/2005 |
| JP | 2006/083276 | 3/2006 |
| WO | 2004/006990 | 7/2004 |

OTHER PUBLICATIONS

International Search Report and Written Opinion regarding corresponding application No. PCT/EP2010/001415, dated Sep. 1, 2010.

* cited by examiner

*Primary Examiner* — Rena L Dye
*Assistant Examiner* — Brett A Crouse

(57) ABSTRACT

Aqueous dispersions comprise a specific copolymer based on acrylate, a specific paraffin wax and one or more dispersants. The dispersions have high stability and are useful for treating textile fabrics, conferring outstanding water-repellent properties thereon.

9 Claims, No Drawings

FLOURINE-FREE AQUEOUS DISPERSION FOR TREATING TEXTILE FABRICS

CROSS REFERENCE TO RELATED APPLICATIONS

This application is the National Phase of International Application PCT/EP2010/001415 filed Mar. 6, 2010 which designated the U.S. and which claims priority to European (EP) Pat. App. No. 09004522.0 filed Mar. 28, 2009. The noted applications are incorporated herein by reference.

FIELD OF THE INVENTION

This invention relates to aqueous dispersions comprising paraffin wax, copolymers and dispersants. The present invention further relates to a process for treating textile fabrics wherein such dispersions are applied to the textile fabrics.

BACKGROUND OF THE INVENTION

It is known to treat textile fabrics such as wovens, knits or nonwovens with aqueous dispersions to endow the fabrics with desired properties. A water-repellent effect is an example of such a desired property. Water-repellent properties on textiles are achieved by using, inter alfa, aqueous dispersions of fluorine-containing products. However, such products are costly and can entail environmentally harmful influences.

Also known from the prior art are aqueous systems comprising n-paraffin and acrylic polymers. This is described for example in EP 1 424 433 B1 and in the abstract of JP 2006/83 276 A2 and also in the abstract of JP 2005/105 042 A2 and of JP 2000/248 140 A2. The cited EP-B1 describes systems containing $C_{1-12}$ esters of acrylic or methacrylic acid. These esters must also contain vinyl esters of certain acids as a monomeric building block. It has emerged that the products of this EP specification or of the two JP abstracts do not provide an optimal water-repellent effect on textiles.

SUMMARY OF THE INVENTION

The invention described hereinbelow has for its object to provide compositions that have high stability even after prolonged storage, that do not contain any fluorine compounds and that provide excellent water-repellent properties on textile fabrics such as wovens, knits or nonwovens, and also a process for obtaining excellent water-repellent properties on textile fabrics.

DETAILED DISCRIPTION OF THE INVENTION

We have found that this object is achieved by an aqueous dispersion comprising no fluorine and no N-methylol compound and comprising at least the components A) to D), where component A) is a copolymer constructed exclusively of the following monomeric building blocks:
a) an acrylate or methacrylate of an alcohol containing 10 to 24 carbon atoms, preferably 12 to 24 and more preferably 16 to 22 carbon atoms, or a mixture of such acrylates and methacrylates
b) styrene or α-methylstyrene
c) vinylidene chloride and/or vinyl chloride
d) optionally 3-chloro-2-hydroxypropyl (meth)acrylate and/or glycidyl (meth)acrylate, component B) is a paraffin wax having a melting range of 58° C. to 80° C., preferably of 65° C.-75° C.
component C) is a dispersant or a mixture of dispersants, preferably a cationic dispersant or a mixture of a cationic dispersant and a nonionic dispersant, and
component D) is water, and by a process for treating textile fabrics by applying a dispersion of the kind described herein to the fabrics.

The compositions of the present invention are aqueous dispersions. They do not contain any fluorine compounds, which has positive repercussions for environmental aspects and for the costs of the products. Nor do they contain any N-methylol compounds. $N-CH_2OH$ compounds have the disadvantage that they can release formaldehyde in undesirable quantities into the ambient atmosphere at elevated temperatures in particular.

The products of the present invention are aqueous dispersions. Their component C) is a dispersant or a mixture of dispersants to ensure the stability of the dispersion. Useful dispersants include known commercially available surface-active products such as nonionic ethoxylated products, for example ethoxylated alcohols or ethoxylated carboxylic acids. Preference for use as component C) is given to commercially available cationic products such as quaternary ammonium salts or dispersant mixtures comprising such cationic products and nonionic products such as mono- or dipropylene glycol for example. An example of a suitable cationic dispersant is the Ethoquad HT/25 product from AKZO Nobel. In dispersant mixtures, the proportion attributable to cationic dispersant is advantageously about 20%-100% by weight, based on the total amount of dispersant mixture.

The dispersions of the present invention preferably contain 0.5% to 3% by weight of dispersant or dispersant mixture (component C)).

The aqueous dispersions of the present invention have very high stability due to their composition.

Component A) in the dispersions of the present invention is a copolymer. This copolymer is exclusively constructed from the hereinbelow recited monomeric building blocks a) to c) and also, optionally, in addition d), since it was found that the incorporation of other monomeric building blocks worsens the effect level with regard to dispersion stability and/or water repellency:
a) an acrylate or methacrylate of an alcohol containing 10 to 24 carbon atoms, preferably 12 to 24 and more preferably 16 to 22 carbon atoms, or a mixture of such acrylates and methacrylates
b) styrene or α-methylstyrene
c) vinylidene chloride and/or vinyl chloride
d) optionally 3-chloro-2-hydroxypropyl (meth)acrylate and/or glycidyl (meth)acrylate.

The acrylates/methacrylates used for preparing component A) of the dispersions of the present invention contain more particularly no carbon-carbon multiple bonds in the alcohol component of these esters.

Monomeric building block a) is an ester of acrylic acid and/or methacrylic acid and an alcohol containing 12 to 24, preferably 16 to 22 carbon atoms, or a mixture of such esters. Monohydric alcohols are preferred. Behenyl acrylate or behenyl methacrylate is particularly useful as monomeric building block a). The underlying alcohols may have a linear construction or optionally include a branched alkyl group.

Acrylates or methacrylates useful as monomeric building block a) are commercially available or can be prepared by following generally known methods. A mixture of an acrylate and a methyacrylate in a molar ratio of about 1:1 is very useful as monomeric building block a).

Monomeric building block b) is styrene or a-methylstyrene and is likewise commercially available.

Monomeric building block c) is vinyl chloride $CH_2=CHCl$ or vinylidene chloride $CH_2=CCl_2$. Again, these products are commercially available.

Monomeric building block d) is not absolutely necessary in the copolymers useful as component A), but can be additionally incorporated, if desired, in order that specific effects may be achieved. Monomeric building block d) is 3-chloro-2-hydroxypropyl (meth)acrylate or glycidyl (meth)acrylate or a mixture thereof.

Copolymers particularly useful as component A) preferably contain the monomeric building blocks a) to d) in the following amounts:

25% to 60% by weight, preferably 35% to 50% by weight of monomeric building block a)
8% to 40% by weight, preferably 15% to 30% by weight of monomeric building block b)
10% to 30% by weight, preferably 15% to 25% by weight of monomeric building block c)
0% to 10% by weight of monomeric building block d)

The copolymers useful as component A) can be prepared from the monomeric building blocks a) to c) and also, optionally, in addition monomeric building block d) by following generally known methods. The copolymerization is typically carried out as a free-radical copolymerization by using a polymerization catalyst. Generally known commercially available products used as free radical initiators can be used as catalysts for the free-radical polymerizations. Useful catalysts for the purposes of the present invention include azo compounds, for example Vazo 56 or Wako V-50 (CAS no. 2997-92-4) from DuPont or WAKO Pure Chemical Industries, respectively.

The amount of polymerization catalyst used can be in the customary known range. Advantageously, it is in the range from 2.5% to 5% by weight, based on the mixture of the monomeric building blocks.

To achieve the positive properties of dispersions of the present invention, it is essential that the three monomeric building blocks a) to c) are present in the copolymer. If desired, monomeric building block d) can additionally be present; however, no monomeric building blocks other than those mentioned may be present, or a deterioration of the effects would occur.

Absent monomeric building block a), the water-repellent effect is not very pronounced.

Absent monomeric building block b), the water-repellent effect is likewise not optimal, Absent monomeric building block c), the water-repellent effect is unsatisfactory in both magnitude and durability.

Tests were conducted outside the scope of protection conferred by the claimed invention to examine the effect of incorporating further monomeric building blocks into the copolymers, for example the incorporation of hydroxyethyl (meth)acrylate.

Component B) of dispersions according to the present invention is a paraffin wax having a melting range of 58° C. to 80° C., preferably of 65° C-75° C. Paraffin waxes having a melting range outside these limits are not very suitable, if at all, for dispersions according to the present invention. Paraffin waxes having a lower melting range than stated above do not provide the desired effect level concerning water repellency of textiles treated with the aqueous dispersions. They also lead to reduced laundering durability on the part of treated textiles. Paraffin waxes having a melting range higher than indicated above may lead to acceptable water repellency and laundering durability for the textiles, but cause these aqueous dispersions to have elevated viscosity, so that these dispersions are technically no longer adequately handleable and, what is more, the dispersions are then more costly and less convenient to manufacture.

Paraffin waxes are known products which are described in the chemical literature, for example in "Römpp Chemie-Lexikon, 9th edition, Georg-Thieme-Verlag, Stuttgart-New York, under the head words "Paraffin" and "Wachse"". Products useful for the dispersions of the present invention in that they have a melting range of 58° C. to 80° C. are commercially available, an example being a paraffin having the melting range 68° C. to 74° C. (CAS no. 8002-74-2).

Component D) of dispersions according to the present invention is water.

Aqueous dispersions according to the present invention can be prepared by the following generally customary methods. The following method is suitable for example: The paraffin wax (component B)) is melted in a vessel. A second vessel is initially charged with a dispersant or dispersant mixture (component C)) before the monomeric building blocks a) and b) (acrylate and styrene or methylstyrene) and optionally d) are added. The mixture obtained is dispersed in hot water at 85° C. by stirring. This dispersion is added to the molten paraffin wax with intensive stirring (using a Turrax for example). On completion of the addition, stirring is continued for a few more minutes. This is followed by high-pressure dispersing, for example at 250 bar and 80 to 85° C. Then, the dispersion is cooled down to room temperature and monomeric building block c) (vinylidene chloride or vinyl chloride) and polymerization catalyst, the latter dissolved in water, are added.

After several hours' reaction time at about 50° C. to 60° C., the copolymerization ends, leaving a very stable aqueous dispersion.

If desired, the resulting aqueous dispersion of the present invention may have added to it further components which are known to be useful as constituents of textile-treating compositions. To retain the advantages of dispersions according to the present invention, namely excellent stability and achievement of outstanding water-repellent properties on textiles, however, no fluorine compounds shall be added nor N-methylol compounds, since the latter may release formaldehyde.

Dispersions according to the present invention preferably contain the components A) to D) in the following amounts:
3% to 20% by weight of component A), preferably 5-15% by weight,
8% to 40% by weight of component B), preferably 10 to 35% by weight,
0.5% to 3% by weight of component C),
55% to 80% by weight of water,
where the weight ratio of component A) to component B) is preferably in the range from 25:70 to 45:70.

When these amount ranges are adhered to, the aforementioned advantages of the dispersions are particularly prominent.

Dispersions according to the present invention are particularly useful for conferring water-repellent properties on textile fabrics. To this end, the textiles are treated with aqueous liquors comprising dispersions according to the present invention. They may further comprise further products known from the field of textile finishing. The textile fabrics thus treated, such as wovens for example, can be used inter alia for the following final articles: ladies' and gents' outerwear.

The treatment of textile fabrics can be carried out by the following generally customary methods, for example by padding, subsequent drying and, where appropriate, curing at temperatures ranging from 140° to 190° C. for example. The textile fabrics preferably consist of cotton, polyester or a cotton-polyester blend. They are normally wovens, knits or nonwovens.

The examples which follow illustrate the invention.

EXAMPLE 1

Inventive 17.5 g of behenyl acrylate, 17.5 g of behenyl methacrylate and 10.0 g of styrene were added to a hot mixture of 12.0 g of Ethoquad HT/25 (ethoxylated quaternary ammonium salt) and 30 g of dipropylene glycol in 450 g of water at 85° C. and dispersed by stirring. In a separate vessel, 105 g of paraffin wax (melting range 68-74° C.) were melted. The above-described dispersion of monomers was added to the molten paraffin wax. This was followed by a further 3 minutes of dispersing and then by a high-pressure dispersing operation (250 bar, 85° C.) until a stable dispersion was obtained. After cooling down to room temperature, 20.0 g of vinylidene chloride and catalyst solution (2.5 g of Wako V-50 in 15 g of water) were added and the mixture was treated for 8 hours at 55° C. under $N_2$ under a donned reflux condenser.

This gives 550 g of a product having an active content of about 26% by weight (determined after drying at 120° C./90 minutes).

EXAMPLE 2

Inventive

This example describes the treatment of textile fabrics with a dispersion prepared as per example 1.

A woven 100% cotton fabric and a woven 100% polyester fabric were treated. The cotton fabric was treated in a pad-mangle with liquor containing 1 g/l of 60% acetic acid, 20 g/l of cellulose crosslinker, 6 g/l of crosslinking catalyst and 60 g/l of the dispersion of example 1. The polyester fabric was padded with liquor containing 1 g/l of 60% acetic acid and 60 WI of the dispersion of example 1. After padding, the fabrics were dried at 110° C. for 10 minutes and then cured at 150° C. for 5 minutes.

The finished fabrics obtained as per example 2 were subjected to the following tests:
a) spray test as per AATCC 22-2005, ISO 4920 (EN 24 920)
b) Bundesmann test as per DIN EN 29865, ISO 9865
Results for Cotton Fabric:
a) spray test, initial value 100 (determined 3×)
    after 5 washes at 40° C.: 3×rated 100
b) Bundesmann, initial values 5; 3; 2 (15% water absorption)
    after 5 washes at 40° C.: 3; 2; 2 (22% water absorption)
Results for PES Fabric:
before wash only minimal water-repellent effect, after wash prominent effect
a) spray test, initial values: 80; 80; 80;
    after 5 washes (at 40° C.): 90-100; 90-100; 90-100
b) Bundesmann: after 5 washes at 40° C.: 5; 4; 4 (1% water absorption)

EXAMPLE 3

Comparative, Not According to Invention

Woven fabrics were treated with the products as per example 3 by raising the quantities used to account for the different active content than example 1.

EXAMPLE 3a

Example 1 was repeated except that no paraffin wax was used. A product having an active content of about 13% by weight (instead of 26% as in example 1) was obtained.

The product was used on cotton in the spray test and gave a value of 80/80/70 (triplicate determination) without washing and a value of 0 after 5 washes.

On PES fabric, the spray test initial value obtained was 0, while the values 50/50/50 were obtained after 5 washes in a triplicate determination.

The results with the formulation as per example 3a were therefore distinctly worse than those of example 1.

EXAMPLE 3b

Not According to Invention

Example 1 was repeated except that no vinylidene chloride was used. The product obtained had an active content of 24% by weight. Treating cotton fabric with this product in the spray test resulted 3 times in a value of 100 (without wash) and 3 times in a value of 0 (after 5 washes). In the Bundesmann test, the values 3; 1; 1 were obtained without washing, coupled with a 33% water absorption. The spray test on PES fabric resulted 3 times in a value of 0 (without washing) and 3 times in a value of 50 after 5 washes.

Therefore the product as per example 3b gave distinctly worse results than the product as per example 1.

What is claimed is:

1. An aqueous dispersion comprising no fluorine and no N-methylol compounds and comprising at least components A) to D), where component A) is a copolymer constructed exclusively of the following monomeric building blocks:
    a) an acrylate or methacrylate of an alcohol containing 10 to 24 carbon atoms or a mixture of such acrylates and methacrylates;
    b) styrene or α-methylstyrene;
    c) vinylidene chloride and/or vinyl chloride; and
    d) optionally 3-chloro-2-hydroxypropyl (meth)acrylate and/or glycidyl (meth)acrylate, component B) is a paraffin wax having a melting range of 58° C. to 80° C., component C) is a dispersant or a mixture of dispersants, and component D) is water.

2. The aqueous dispersion according to claim 1 comprising components A) to D) in the following amounts:
    3% to 20% by weight of component A),
    8% to 40% by weight of component B),
    0.5% to 3% by weight of component C), and
    55% to 80% by weight of component D).

3. The aqueous dispersion according to claim 1 wherein component A) is constructed from the following amounts of the monomeric building blocks a) to d):
    25% to 60% by weight of monomeric building block a);
    8% to 40% by weight of monomeric building block b);
    10% to 30% by weight of monomeric building block c); and
    0% to 10% by weight of monomeric building block d).

4. The aqueous dispersion according to claim 1 wherein the monomeric building block a) is an acrylate or methacrylate of an alcohol containing 16 to 22 carbon atoms or a mixture of such acrylates or methacrylates.

5. The aqueous dispersion according to claim 1 wherein component C) is a cationic dispersant or a mixture of a cationic dispersant and a nonionic dispersant.

6. The aqueous dispersion according to claim 2 wherein the weight ratio of component A) to component B) is in a range from 25:70 to 45:70.

7. A process for treating a textile fabric comprising applying a dispersion according to claim 1 to the fabric.

8. The process according to claim 7 wherein the textile fabric comprises cotton, polyester or a cotton-polyester blend.

9. A textile fabric produced according to claim 7.

* * * * *